(12) United States Patent
Nagano et al.

(10) Patent No.: US 6,266,304 B1
(45) Date of Patent: Jul. 24, 2001

(54) DISC ECCENTRICITY MEASURING APPARATUS AND METHOD THEREOF AND APPARATUS FOR RECORDING AND/OR REPRODUCING DISC-SHAPED RECORDING MEDIUM

(75) Inventors: Shuichi Nagano, Kanagawa; Takashi Kanai, Chiba, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/309,907

(22) Filed: Sep. 21, 1994

(30) Foreign Application Priority Data

Sep. 28, 1993 (JP) ................................. 5-263092
Sep. 28, 1993 (JP) ................................. 5-263093

(51) Int. Cl.$^7$ ................................. G11B 7/095
(52) U.S. Cl. ................... 369/44.32; 369/53.14; 369/44.29
(58) Field of Search .............. 369/44.25–44.27, 369/44.29, 44.32, 44.35, 54, 58, 53.14; 360/77.04, 77.06, 77.08

(56) References Cited

U.S. PATENT DOCUMENTS

| 4,149,199 | 4/1979 | Chick et al. |
|---|---|---|
| 4,745,588 | 5/1988 | Yoshikawa et al. ............ 369/32 |
| 5,404,346 | * 4/1995 | Koyama et al. ............ 369/44.32 |

FOREIGN PATENT DOCUMENTS

| WO 86/05307 | 9/1986 | (DE) . |
| 2 085 192 | 4/1982 | (GB) . |
| 119650 | 4/1994 | (JP) . |

OTHER PUBLICATIONS

Patent Abstracts of Japan, vol. 8, No. 157, (P–288), [1594], Jul. 20, 1984, & JP59–54047.
Patent Abstracts of Japan, vol. 6, No. 217, (P–152), [1095], Aug. 30, 1982, & JP57–120236.

* cited by examiner

Primary Examiner—W. R. Young
(74) Attorney, Agent, or Firm—Oblon, Spivak, McClelland, Maier & Neustadt, P.C.

(57) ABSTRACT

A recording and/or reproducing apparatus for a disc-shaped recording medium which includes an optical head, a motor driven table for rotating the disc-shaped recording medium, a slider for moving the optical head relative to the motor driven table in a radial direction of the disc-shaped recording medium, an error signal generator for generating an error signal exhibiting the amount of the relative shifting of a spot of a light beam irradiated from the optical head on the disc-shaped recording medium with respect to a track on the disc-shaped recording medium, and a controller which detects a peak value and a trough value of the error signal supplied from the error signal generator and compares the difference between the detected peak value and the detected trough value with a reference threshold value to generate a drive signal for the slider on the basis of the comparison, wherein the drive signal from the controller is supplied to the slider to shift the optical head relative to the motor driven table in the radial direction of the disc-shaped recording medium to correct for eccentricity of the disc-shaped recording medium.

11 Claims, 11 Drawing Sheets

DISC ECCENTRICITY MEASURING APPARATUS AND METHOD THEREOF AND APPARATUS FOR RECORDING AND/OR REPRODUCING DISC-SHAPED RECORDING MEDIUM

BACKGROUND OF THE INVENTION

1. Field of the Invention

The present invention relates to a disc-shaped recording medium eccentricity measuring apparatus and a method thereof, and an apparatus for recording and/or reproducing the disc-shaped recording medium. More particularly, the invention relates to a disc-shaped recording medium eccentricity measuring apparatus for measuring the disc-shaped recording medium on the basis of a tracking error signal and a method thereof, and an apparatus for recording and/or reproducing the disc-shaped recording medium, which is equipped with the eccentricity measuring apparatus.

2. Discussion of the Related Art

Disc recording or reproducing apparatus are equipped with actuators for driving objective lenses for optical heads in accordance with a tracking error signal obtained from track guide information such as rows of pits or grooves for controlling the optical spot tracking. The apparatus also include a sled mechanism for displacing the relative position of the whole of the optical head and the disc surface with respect to the direction of the diameter of the disc.

Methods for the sled mechanism where the whole of the optical head is shifted with respect to the disc, and where a turntable on which the disc is mounted is shifted with respect to a fixed position of the optical head are well known.

There is also a method where a sled error signal is generated by extracting the low frequency component from the tracking error signal by passing it through a low pass filter, amplifying it, and then applying it to a drive motor as a drive signal. The sled error signal is a signal exhibiting the amount of the offset between the whole of the optical head and the objective lens for which the actuator within the optical head drives the tracking.

FIGS. 1a to 1c show the waveforms of those signals. FIG. 1c is the tracking error signal which is supplied to a low pass filter to generate the sled error signal shown in FIG. 1b. The sled drive signal shown in FIG. 1a is then obtained.

The sled error signal in FIG. 1b exhibits the angle of radiation of a light beam applied from the optical head with respect to a disc surface. The sled mechanism should therefore carry out shifting in such a direction that the angle of radiation is vertical and the sled error signal becomes zero.

However, even if the sled drive signal is applied to the sled motor, a point at which the shift of the optical head commences depends on the stationary coefficient of friction of the sled mechanism. As the stationary coefficient of friction disperses depending on the apparatus in accordance with load mass and construction of the sled mechanism etc., it is difficult to control the actual sled operation effectively just using this drive voltage.

For example, in FIG. 1a, if the stationary coefficient of friction is first exceeded so that motion commences at a point in time when the sled drive voltage reaches a voltage $S_s$, a period between $T_1$ and $T_2$ becomes a dead band period where there is no actual sled operation even though a voltage is being applied. Also, design and adjustment is made extremely difficult because this operation starting point disperses.

Further, when the sled mechanism starts the shift of the optical head, as shown by the period from $T_2$ to $T_3$ in FIG. 1b, the sled error signal is reduced until it is close to zero, so that when the sled error signal becomes zero, the light beam is applied vertically onto the disc surface. However, if the motion coefficient of friction for the sled mechanism is large, it will stop before the sled error signal becomes zero. This causes that the optical beam to always be applied at an angle which is slightly off from the vertical. As this motion coefficient of friction also disperses, operation stoppage control using the drive signal becomes difficult.

Also, as a voltage is always being applied to the sled motor, the influence of voltage fluctuations going to other circuit parts are ever present and this has a detrimental effect on the equipment as a whole.

As a result of this, this applicant put forward a previous technology in Japanese Patent Application No. 4-288196 where a sled shift pulse is applied to a sled mechanism when the sled error signal exceeds a certain threshold value.

This is as shown in FIGS. 2a to 2d, the sled error signal in FIG. 2b obtained as the low frequency component of the tracking error signal in FIG. 2c is compared with a prescribed threshold value $S_{TH}$. When, as in at the times $T_7$ and $T_9$, the sled error signal reaches the threshold value $S_{TH}$, pulses shown in FIG. 2a are outputted as a drive signal. Here, a pulse voltage Vs is set at a voltage sufficient to overcome the coefficient of friction. The threshold value $S_{TH}$ is then set at a value which is such that the tracking control for the optical head due to the actuator does not exceed a value of this trailing limit. That is, a drive pulse is applied to the sled mechanism when at a tracking trailing limit or when close to the limit using the actuator, whereby the optical head is shifted.

If a fixed voltage pulse of a voltage which is sufficient to overcome the coefficient of friction is used for the drive signal and the period for which this voltage is applied is set based on the sled error signal, instabilities in the shift operation, which depend on dispersion in the coefficient of friction, can be resolved. As a result, an excellent shift operation can be achieved so that the problems mentioned above may be resolved.

However, in a disc which is scanned by the optical head during a recording or reproducing operation, eccentricity due to the fabrication etc., eccentricity due to errors on the disc chucking mechanism or eccentricity due to chucking shifts caused at the time of loading or generated by disturbances occurs.

As a result of these eccentricities, the sled error signal actually becomes a sine waveform shown in the expanded view of FIG. 2d. The frequency of this waveform is the disc rotation frequency, i.e. one period thereof is the equivalent to one rotation period of the disc.

However, in the case where the shift operation of the optical head is carried out in response to the level of the aforementioned sled error signal, it is difficult to carry out accurate shift operation during the execution of the shift operation determination, that is, the comparison between the level of the sled error signal and the threshold value $S_{TH}$, as a result of the effects of level fluctuations due to these eccentricities.

A comparison result is therefore obtained which corresponds to a measurement of the extent of the eccentricity taken with respect to the loaded disc in order to cancel out the effects of this eccentricity.

For example, from these kinds of conditions, the amount of eccentricity for a disc in a disc player etc. can be measured.

A method of measuring this extent of eccentricity is, for example, to half rotate the disc with the tracking servo turned off. At this time, as the position to which the laser spot is applied is fixed with the tracking servo turned off, if there is any eccentricity, the beam spot crosses the track and a traverse signal is therefore detected. The number of tracks which are crossed over, that is, the traverse count number, is then taken as the measurement of the eccentricity value at this time.

However, items such as a disc half rotation detecting means are necessary with this kind of measuring method, which makes the construction complicated. This is not suitable for adoption in public use disc players etc.

Further, this cannot be carried out during operations such as reproduction etc. because the tracking servo has to be turned off. As a result, cases cannot be coped with whereby chucking shifts due to disturbances etc. occur during reproduction etc. or the eccentricity component is generated afresh.

SUMMARY OF THE INVENTION

It is therefore an object of the present invention to provide an apparatus for recording and/or reproducing a disc-shaped recording medium, which resolves the above-mentioned problems.

It is another object of the present invention to provide a method of measuring the amount of eccentricity of a disc-shaped recording medium, which resolves the above-mentioned problems.

It is further object of the present invention to provide an apparatus for measuring the amount of eccentricity of a disc-shaped recording medium, which resolves the above-mentioned problems.

According to the present invention, there is provided an apparatus for recording and/or reproducing the disc-shaped recording medium, including an optical head, a disc rotationally driver, a transfer unit, an error signal generator and a controller. The optical head irradiates an optical beam onto the disc-shaped recording medium. The disc rotationally driver is equipped with a disc-shaped recording medium and rotates the disc-shaped recording medium equipped. The transfer unit transfers the optical head and the disc rotationally driver relatively in a radial direction of the disc-shaped recording medium. The error signal generator generates an error signal exhibiting the amount of the relative shifting of a spot of a light beam irradiated from the optical head, which is produced on the basis of an output signal from the optical head, on the disc-shaped recording medium with respect to a track on the disc-shaped recording medium. The controller detects a peak value and a trough value of the error signal supplied from the error signal generator and compares a signal exhibiting a difference between the detected peak value and the detected trough value with a reference value to generate a drive signal to be supplied to the transfer unit on the basis of a comparison output signal. The transfer unit transfers the optical head and the disc rotational driver in the radial direction of the disc-shaped recording medium by receiving the drive signal from the controller.

According to the present invention, there is provided a method of measuring the amount of eccentricity of the disc-shaped recording medium, including first, second and third steps. In the first step, an error signal exhibiting the amount of relative displacement of a spot of a light beam irradiated from an optical head onto the disc-shaped recording medium with respect to a track on the disc-shaped recording medium is generated on the basis of an output signal from the optical head. In the second step, a peak value and a trough value of the error signal thus generated are detected to generate a difference signal exhibiting a difference between the peak and trough values thus detected. In the third step, the amount of eccentricity of the disc-shaped recording medium is calculated on the basis of the difference signal.

According to the present invention, there is provided an apparatus for measuring the amount of eccentricity of a disc-shaped recording medium, including an error signal generator and a calculator. The error signal generator generates an error signal exhibiting the amount of relative displacement of a spot of a light beam irradiated from the optical head onto the disc-shaped recording medium with respect to a track on the disc-shaped recording medium on the basis of an output signal from the optical head. The calculator detects a peak value and a trough value of the error signal supplied from the error signal generator to calculate the amount of eccentricity of the disc-shaped recording medium on the basis of a difference signal exhibiting a difference between the peak and trough values thus detected.

DETAILED DESCRIPTION OF THE PREFERRED EMBODIMENTS

Hereinafter, description will be given of a disc eccentricity measuring apparatus in accordance with an embodiment of the present invention with reference to FIGS. 3 to 11.

Figure 2:
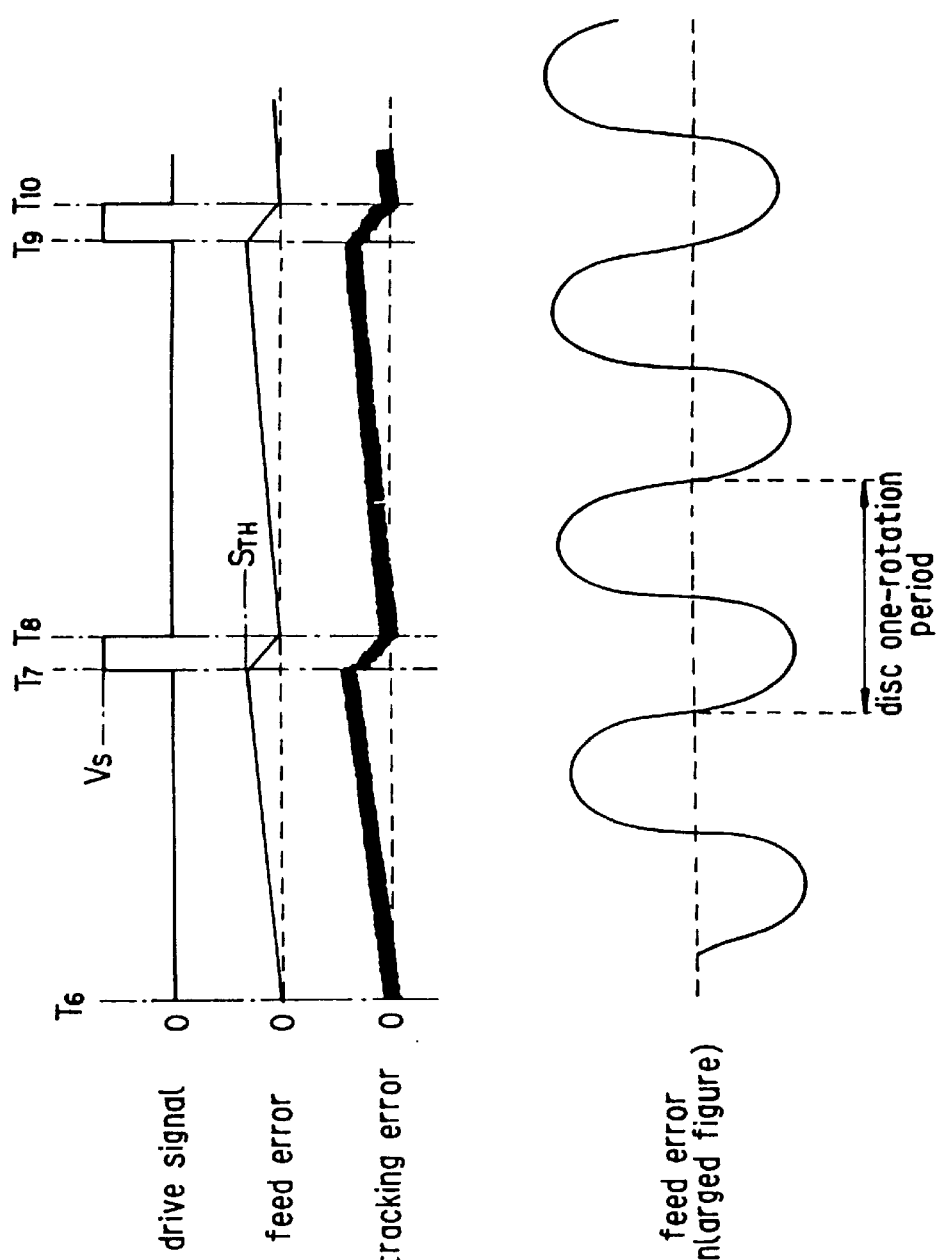
FIGS. 2a to 2d are explanatory diagrams showing the sled control operation.
Figure 3:
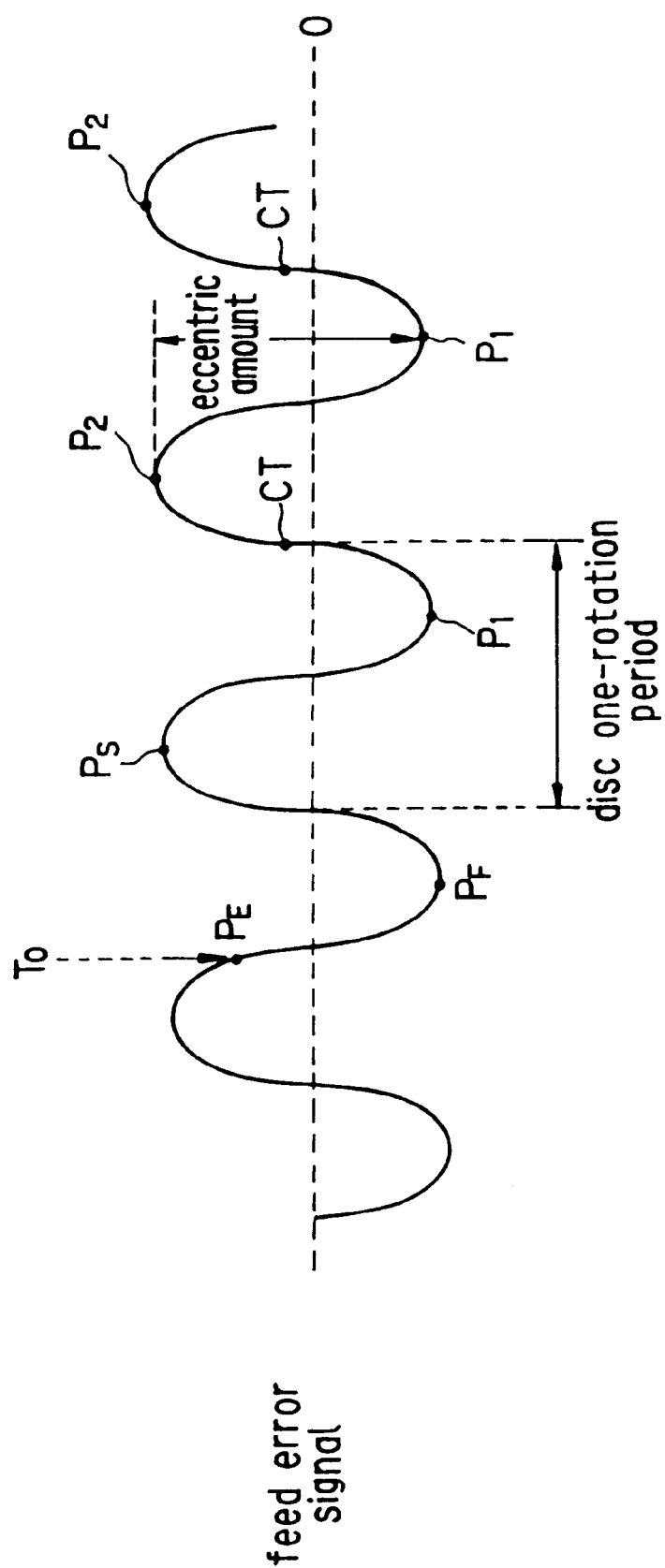
FIG. 3 is an explanatory diagram showing the eccentricity measuring operation in accordance with an embodiment of the present invention.
Figure 4:
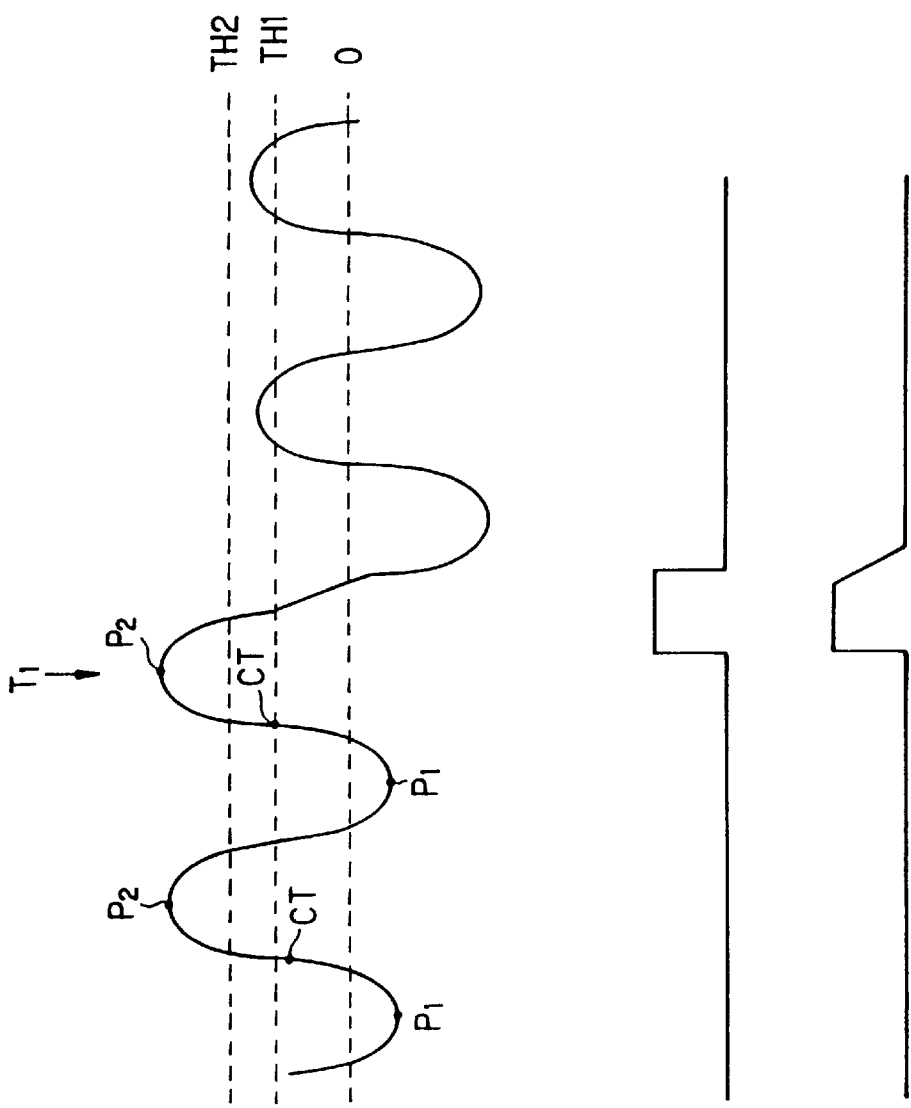
FIGS. 4a to 4c are explanatory diagrams showing the sled control operation in accordance with the embodiment of the invention.
Figure 5:
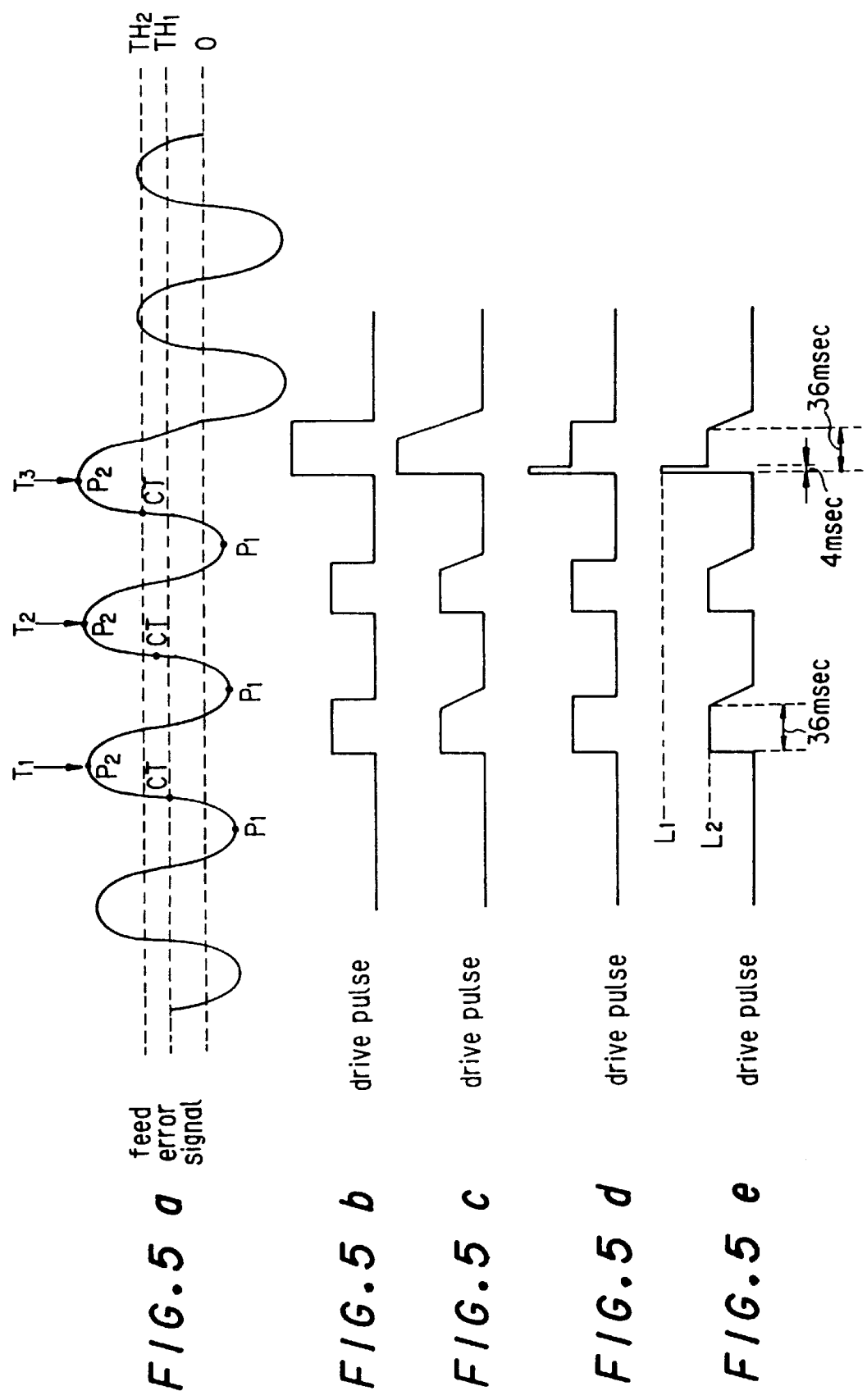
FIGS. 5a to 5e are explanatory diagrams showing the sled control operation in accordance with the embodiment of the invention.

FIG. 3 shows a sled error signal similar to that shown in FIG. 2d. The disc eccentricity apparatus in accordance with this embodiment calculates the amount of the eccentricity from this sled error signal.

The waveform shown in FIG. 3 is a sine wave-shaped waveform expressed in accordance with the influences of the deviation. It follows that it's period is equivalent to one rotational period of a disc and that a difference between a peak value $P_2$ and a trough value $P_1$ is equivalent to the amount of the deviation.

This signal is therefore sampled at prescribed times and the peak values $P_2$ and the trough values $P_1$ are detected. The extent of the eccentricity is then obtained from the difference between these two items.

At the point in time when the calculation of the eccentricity commences, the first peak value $P_S$ is detected. An initial extent of eccentricity is then calculated using the trough value $P_1$ and the peak value $P_2$ detected after this. It will not be at all certain that the peak value or trough value detected first of all will be an extreme value as it depends on a signal value from during the beginning of the sampling. There is therefore an item to prevent the measuring of the extent of the eccentricity using mistaken extreme values obtained in this way. For example, if the sampling starts at a time $T_0$, then the first peak value detected is $P_E$. If the extent of the eccentricity is then calculated using the difference between the trough value $P_F$ detected next and the peak value $P_E$, this value will be inaccurate. The trough value $P_1$ and the peak value $P_2$ used in the calculations are obtained after the one-time peak value $P_s$ has been confirmed.

After the trough value $P_1$ and the peak value $P_2$ have been obtained in this way, from the following period onwards the trough values and the peak values are used as the trough values $P_1$ and the peak values $P_2$ in the calculations for the extent of the eccentricity without modification as there will be no mistaken detection of extreme values of the kind described above.

By obtaining the extent of the eccentricity from the trough values $P_1$ and the peak values $P_2$ for the sled error in this way in this embodiment, the extent of the eccentricity can be obtained, for example, every rotational period during reproducing operation etc.

By doing this, sled control in which the influence of eccentricity can be canceled can be carried out based on measurements for the extent of deviation taken in this way.

The sled error signal exhibits the whole offset amount for the objective lens and the optical head. With the waveform shown in FIG. 3, it is shown that the objective lens is driven by the tracking operation in a direction which negates the influence of the eccentricity. The average value of the trough value $P_1$ and the peak value $P_2$ (CT in the diagram) is an offset amount for canceling the effects of the eccentricity. It is therefore preferable to work out the shift for the relative positions of the optical head and disc based on this average value CT.

Each of the various examples of sled control carried out based on the average value CT is shown in FIGS. 4a to 5e.

FIG. 4a shows the sled error signal while the extent of the offset for the objective lens with respect to the whole the optical head is being amplified as far as the region of the trailing limit. An average value $C_I$ is obtained from this sled error signal every eccentricity component cycle. Then, when it is intended to carry out a shift, the threshold value $TH_1$ to be taken as the offset amount is set up and the calculated average value CT is compared with this threshold value $TH_1$.

In a first example of a drive pulse used in the sled control, as shown in FIG. 4b, a drive pulse is generated for a predetermined duration from the time when the average value CT exceeds the threshold value $TH_1$.

The time when the average value CT can be detected to have exceeded the threshold value $TH_1$ is when the peak value $P_2$ is detected. An average value CT is then calculated from this peak value $P_2$ and the previous trough $P_1$, and this is then compared with the threshold value $TH_1$. It therefore follows that the output for the drive pulse occurs after the time $T_1$ at which the peak value $P_2$ is detected.

An appropriate operation of the optical head which cancels out the effects of the eccentricity can therefore be achieved by carrying out the sled control by comparing the average value CT for the extent of the offset and the threshold value $TH_1$.

In a second example of a drive pulse used in a sled control, as shown in FIG. 4b, a drive pulse is generated for a prescribed period from the time when it is detected that the value CT has exceeded the threshold value $TH_1$. Also, the level of the drive pulse comes down gradually while the drive is in halt.

If supply of the drive pulse is rapidly suspended, the optical head will come to an abrupt halt, which will cause disturbance to the tracking servo. However, as shown in FIG. 4c, having the level of the drive pulse come down gradually means that the shift acceleration of the optical head is also reduced gradually. This shifting then negates the coefficient of frictional motion so as to make the shifting speed of the entire optical head slower until it comes to a halt. By halting the shifting of the optical head in this gentle manner, disturbances to the tracking servo can be prevented.

A third example of a drive pulse used in sled control is actually a modifiction of the first example of the drive pulse used in the sled control. Here, if the stationary friction coefficient of the sled mechanism is large, even if a drive pulse is applied, the shift of the optical head will not occur, as shown in FIG. 4b. Instead, as shown in FIG. 5a, the level of the sled error signal, that is, the extent of the offset is amplified without being modified. If this continues without change, it will not be possible to follow the tracking and it will therefore not be possible to read signals from the disc.

The threshold value $TH_2$ is therefore set at a level which is higher than the threshold value $TH_1$ the average value CT is then compared with this threshold value $TH_2$.

Then, as shown in FIG. 5b, an ordinary level drive pulse is generated when the average value CT becomes higher than the threshold value $TH_1$. However, the shifting of the optical head is not carried out without any modifications taking place so that when the average value CT exceeds the threshold value $TH_2$, the drive pulse is generated as a higher voltage pulse. In this way, the shifting of the optical head can be carried out more accurately.

In a fourth example of a drive pulse used in sled control, this third example of the drive pulse used in the sled control is combined with the second example of the drive pulse used in the sled control (FIG. 4c) so that a drive pulse as shown in FIG. 5c is generated.

A fifth example of a drive pulse used in sled control is a development of the third example of the drive pulse used in the sled control (FIG. 5b). In this case, a higher voltage pulse is generated as the drive pulse when the average value CT exceeds the threshold value $TH_2$. However, if a high level pulse is continually applied in order that a simple pulse drive will provide uniform acceleration, the shifting speed will become too high. As a result of this, the amount of shifting will become excessive and the control will be considered to be unstable. Therefore, as shown in FIG. 5d, a high level pulse applied only for the first prescribed period and ordinary level voltages are applied as the drive pulses after that. By making the drive pulse a composite pulse in this way, the drive can be started with a voltage which is sufficient with respect to the initial stationary friction coefficient and a stable shift of the optical head can be carried out at normal speed using a normal level pulse after this time.

A sixth example of a drive pulse used in a sled control is a composition of the first to fifth examples of the drive pulses used in the sled control and generates a drive pulse shown in FIG. 5e. That is, in this example of the drive pulse used in the sled control, the influences of the eccentricity on the sled operation are canceled, the generation of disturbances in the tracking servo due to rapid sled halting is prevented, and the inability to follow the tracking due to poor sled starting caused by irregularities in the stationary friction coefficient is resolved, as are control instabilities due to the rapidness of the shift speed.

Here, the applied voltage was selected using two stage threshold values $TH_1$ and $TH_2$. However, finer control can be achieved by applying voltage values using threshold values of three stages or more.

Also, as becomes clear from the first to sixth examples of the drive pulses used in the sled control, the drive pulse is applied directly after or at a prescribed period after a time ($T_1$, $T_2$, $T_3$) at which a peak $P_2$ is detected due to an value CT exceeding a threshold value $TH_1$ or $TH_2$ i.e. the period for which the drive pulse is supplied it takes for the sled error signal to go from a peak point to a trough point. This is the period for the objective lens to be shifted from the outer side of the disc to the inner side by the tracking servo. As this period can be considered to be that of the drive pulse, then the whole of the optical head shifts from the inner side of the optical disc to the outer side i.e. the opposite way to that of the objective lens.

In this way, the objective lens acceleration can be made small during the sled operation and the tracking control can be made stable, as can the shifting of the optical head which accompanies it.

Taking into consideration the period where the sled error signal goes the opposite way from this i.e. from a trough to a peak, that is to say, the period of the sled error pulse where the objective lens is shifted from the inner side to the outer side of the disc, if the whole of the optical head is shifted from the inner side of the disc to the outer side, the optical head shifting process cannot be carried out in a stable manner as the acceleration has to be greatly increased to shift the objective lens to the outer circumference.

For these reasons, the drive pulse is a fixed period pulse so that the shifting of the optical head is completed in the period where the sled error signal goes from a peak to a trough. This fixed period is decided based on the rotational of the disc. For example, in the case of a compact disc player, the drive pulse output period is in the region of 30 to 50 msecs as the disc rotates about 200 to 500 times a minute.

For example, in the slide drive pulse in FIG. 5e, after a normal level pulse is applied for about 36 msecs, the level gradually comes down. Also, the high level pulse for when the average value CT exceeds the threshold value $TH_2$ is only applied for the first 4 msecs.

Rather than setting the application of the drive pulse to a prescribed period, the application of the drive pulse could also be completed by detecting when the shifting of the objective lens towards the inner side of the disc has been completed.

Hereinafter, a description will be given in more detail of a disc reproducing apparatus in accordance with an embodiment of the present invention where eccentricity is measured using a sled error signal, an average value CT is obtained, and the sled control in FIG. 5e is carried out.

First, the construction of the essential parts of the disc reproducing apparatus into which the disc eccentricity measuring apparatus is installed so as to make up this embodiment will be described with reference to FIGS. 6 and 7.

Figure 6:
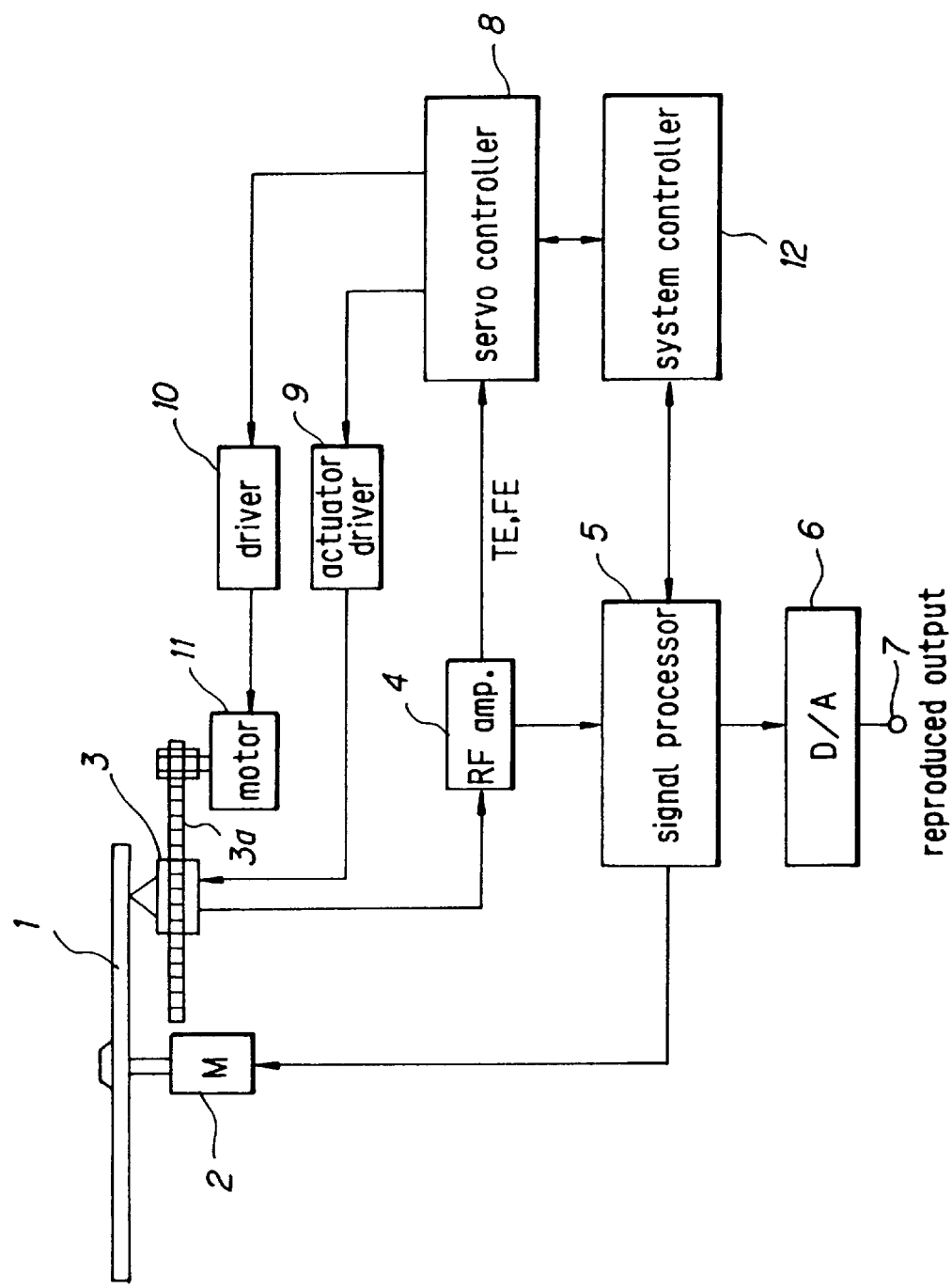
FIG. 6 is a block diagram showing the essential parts of a reproducing apparatus which makes up the embodiment of the invention.

In FIG. 6, reference numeral 1 indicates an optical disc such as, for example, a compact disc etc. which is rotatably driven by a spindle motor 2. Information recorded on the optical disc 1 is read by the optical head 3. At the optical head 3, an optical beam outputted from, for example, a semiconductor laser is converged from the objective lens onto the recording surface of the optical disc 1 as a beam spot via an optical system made up from a diffraction grating, beam splitter and a ¼ wavelength plate. The light reflected back is then inputted into a detector by the optical system so that pit playback information is obtained.

As the objective lens controls the focus of the beam spot converged on the recording surface of the optical disc and controls the tracking, it is supported by an actuator capable of taking it in a direction away from the optical disc 1 as well as in a direction along the diameter of the disc.

Information as electrical signals corresponding to the amount of light detected by the detector in the optical head 3 is supplied to an RF amplifier 4 which undergoes processing such as arithmetic operations and amplification etc. Reproduced signals such as musical data etc. as well as tracking error signals TE and focus error signals FE etc. are extracted from the RF amplifier 4.

After the reproduced signal outputted from the RF amplifier 4 has undergone error correction processing and demodulation processing etc.in a signal processor 5 after it has been sent to the signal processor 5, it is outputted as, for example, L and R audio signals from the terminal 7 after having gone via the D/A converter. Also, the number of rotations of the spindle motor 2 is, for example, CLV (Constant Linear Velocity) controlled using a pulse generated by the internal PLL taken from the reproduced signal.

The tracking error signal TE and the focus error signal FE are provided to a servo controller 8. Then, after processing such as phase compensation is carried out by the servo controller 8, these are sent to an actuator driver 9 which drives the actuator as tracking drive signals and focus drive signals. The drive voltage outputted from the actuator driver 9 is applied to the actuator in the optical head 3 and the shifting of the objective lens is controlled in the tracking direction and the focusing direction in such a manner that the respective error signals become zero.

Further, at the servo controller 8, after the tracking error signal TE has undergone phase compensation, it's low frequency component is extracted by a low pass filter and this is taken as the sled error signal.

As described in the following, the sled drive signal based on the sled error signal is provided to the driver 10. The driver 10 applies a driving voltage to a slide motor 11 based on the drive information. The rotational force of the slide motor 11 is decelerated to a prescribed level using gear ratios, for example, transmission is carried out via the rack gear 3a of the optical head 3 and the whole of the optical head 3 is shifted across the diameter of the optical disc 1.

Reference numeral 12 indicates a system controller formed from a microcomputer, which outputs the operation control signals for each part. For example, the system controller 12 performs control such as the loop opening and closing of the servo system, acceleration pulses, and deceleration pulses etc. for the servo controller 8. Also, it also controls the taking of eccentricity measurements and the generation of the drive pulses, which are to be described later.

Figure 7:
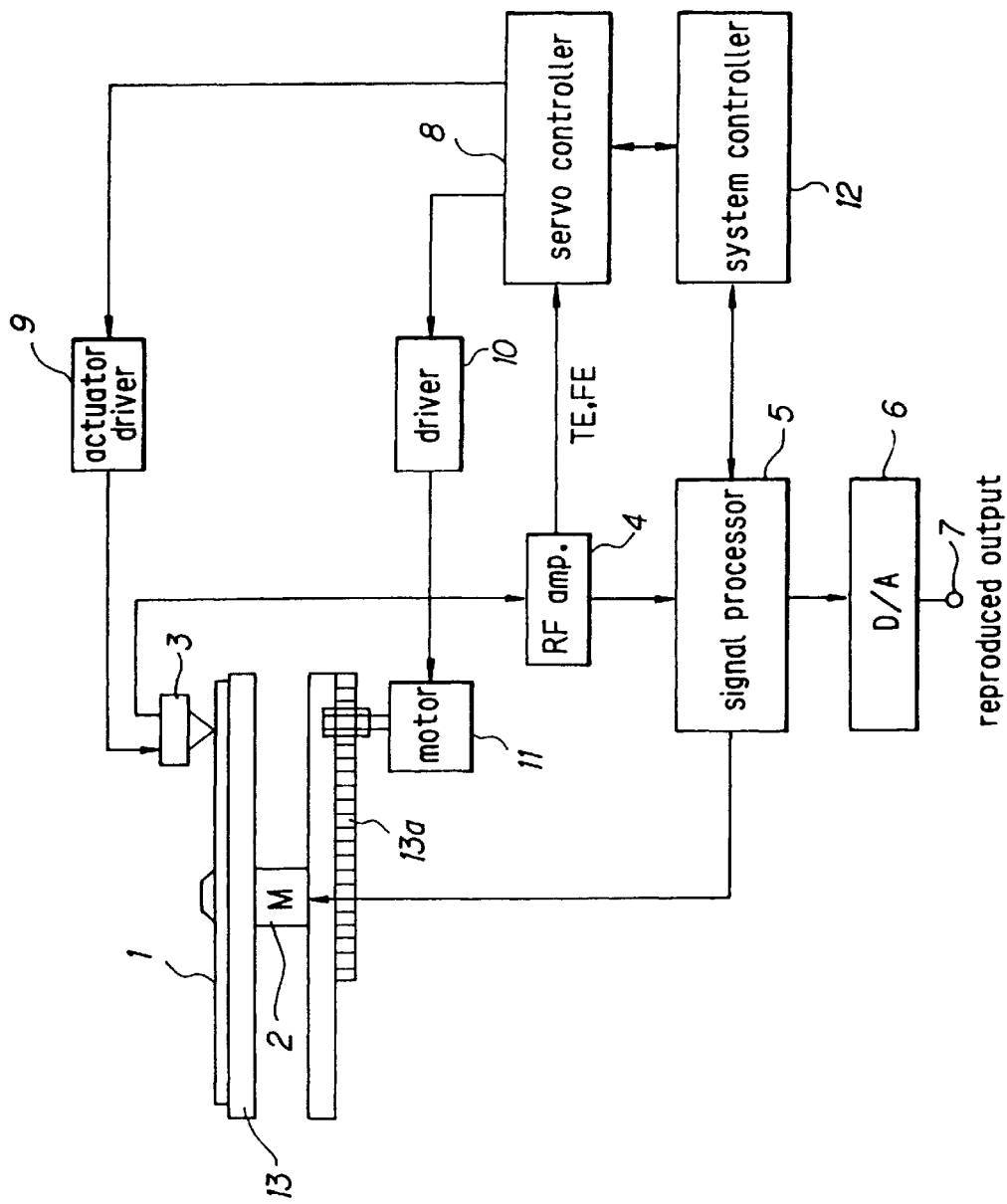
FIG. 7 is a block diagram showing the essential parts of a further reproducing apparatus which makes up the embodiment of the invention.

FIG. 7 is a further example of a structure for a reproducing apparatus. Portions which are the same as portions in FIG. 6 are given the same numerals and their descriptions are omitted. In this case, the optical disc 1 is loaded on a turntable 13 and is rotated as a result of the turntable 13 being rotated by the spindle motor 2. On the other hand, the optical head is fixed, the turntable 13 has, for example, a rack gear 13a set up on it and this then interlocks with a gear which transmits the rotational force of the slide motor 11. By then shifting the turntable 13 using the slide motor 11, the relative positions of the optical head 3 and the optical disc 1 can be displaced along the direction of the diameter of the disc.

It is also possible to use a linear motor at the sled mechanism in the structures in FIGS. 6 and 7.

The structures for the reproducing apparatus in FIGS. 6 and 7 are applied to the embodiment in this invention. However, the system controller 12 and the servo controller 8 in FIGS. 6 or 7 also carry out the eccentricity measurement operation and the sled operation in this invention. A block diagram of the of the structure of the processes carried out by the internal hardware and software and the process for the tracking error signal is therefore provided in FIG. 8.

Figure 8:
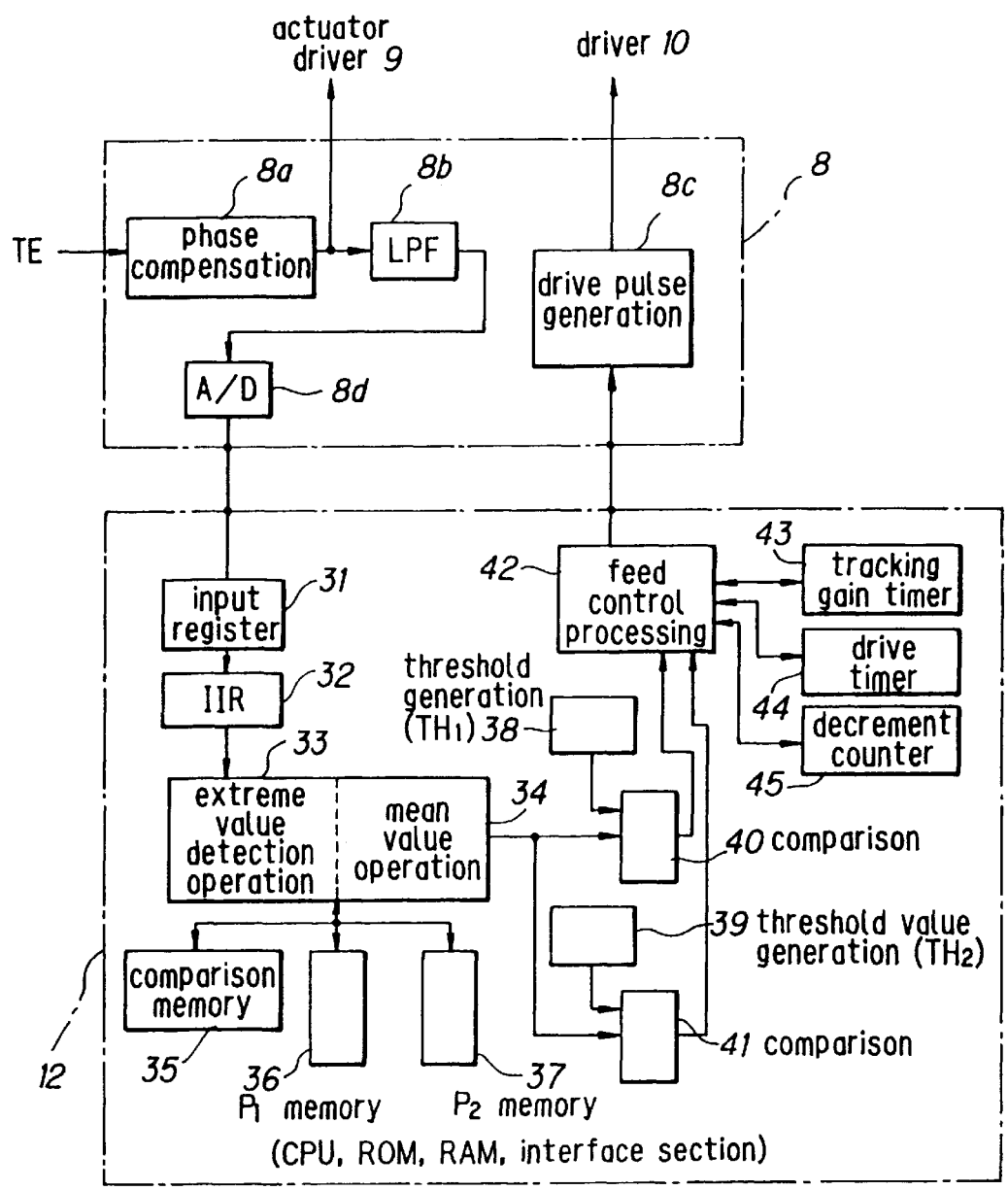
FIG. 8 is a conceptual block diagram showing the construction of the essential parts of a system controller and a servo controller in accordance with the embodiment of the invention.

The system controller 12 actually consists of a microcomputer made up of a CPU, ROM, RAM and interface. In FIG. 8, a conceptual block diagram of the structure of the hardware which carries out these operations using software is shown.

Figures 1A, 1B, 1C:
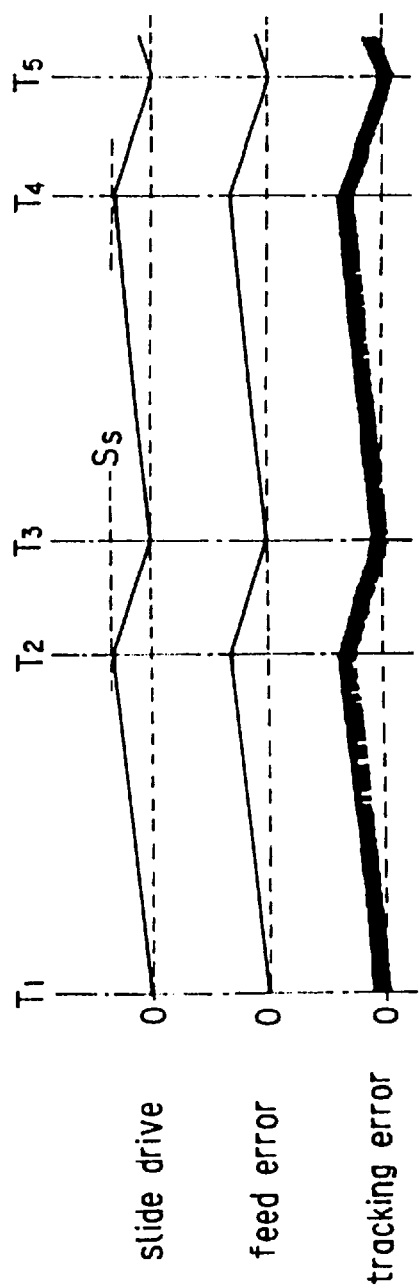
FIGS. 1a to 1c are explanatory diagrams showing a conventional sled control operation.

Reference numeral 8a in FIG. 8 indicates a phase compensation circuit which carries out phase compensation on the tracking error signal TE shown in FIG. 1c which is provided to the servo controller 8 and outputs the tracking drive signal for the actuator 9. The low frequency component of the output from the phase compensation circuit 8a is extracted by the low pass filter 8b and a sled error signal is generated.

The sled error signal is made into digital data by passing it through the A/D converter 8d and it is then inputted into the system controller 12, so as to be taken in by the input register 31. The A/D converter may be set up internally within the system controller 12 or may be set up as an external circuit.

At the system controller 12, there is a filter 32 for carrying out filter operations on the inputted sled error data which was sampled by the A/D converter, an extreme value detection calculating section 33 which obtains the peak values ($P_s$, $P_2$) and the trough values ($P_1$) using the sled error data obtained via the filter 32, a comparing memory 35 which serves as a register for the extreme detection operation, a $P_1$ memory 36 and $P_2$ memory 37 for holding the detected peak value ($P_2$) and the trough value ($P_1$) and an average value calculating section 34 for calculating the average value CT from the detected peak value ($P_2$) and the trough value ($P_1$).

Also, a threshold value $TH_1$ generating section 38, a threshold value $TH_2$ generating section 39 and comparing sections 40 and 41 are set up for comparing the average value CT with the threshold values $TH_1$ and $TH_2$ and a slide control processing section 42 is set up for carrying out slide drive control in accordance with the comparison results for the comparing sections 40 and 41.

The slide control processing section 42 outputs the slide control signal to the drive pulse generator 8c in the servo controller 8 in accordance with the comparison results from the comparing sections 40 and 41 and in accordance with the sum of the tracking gain timer 43, the sled drive timer 44 and the decrement counter 45.

Figure 9:
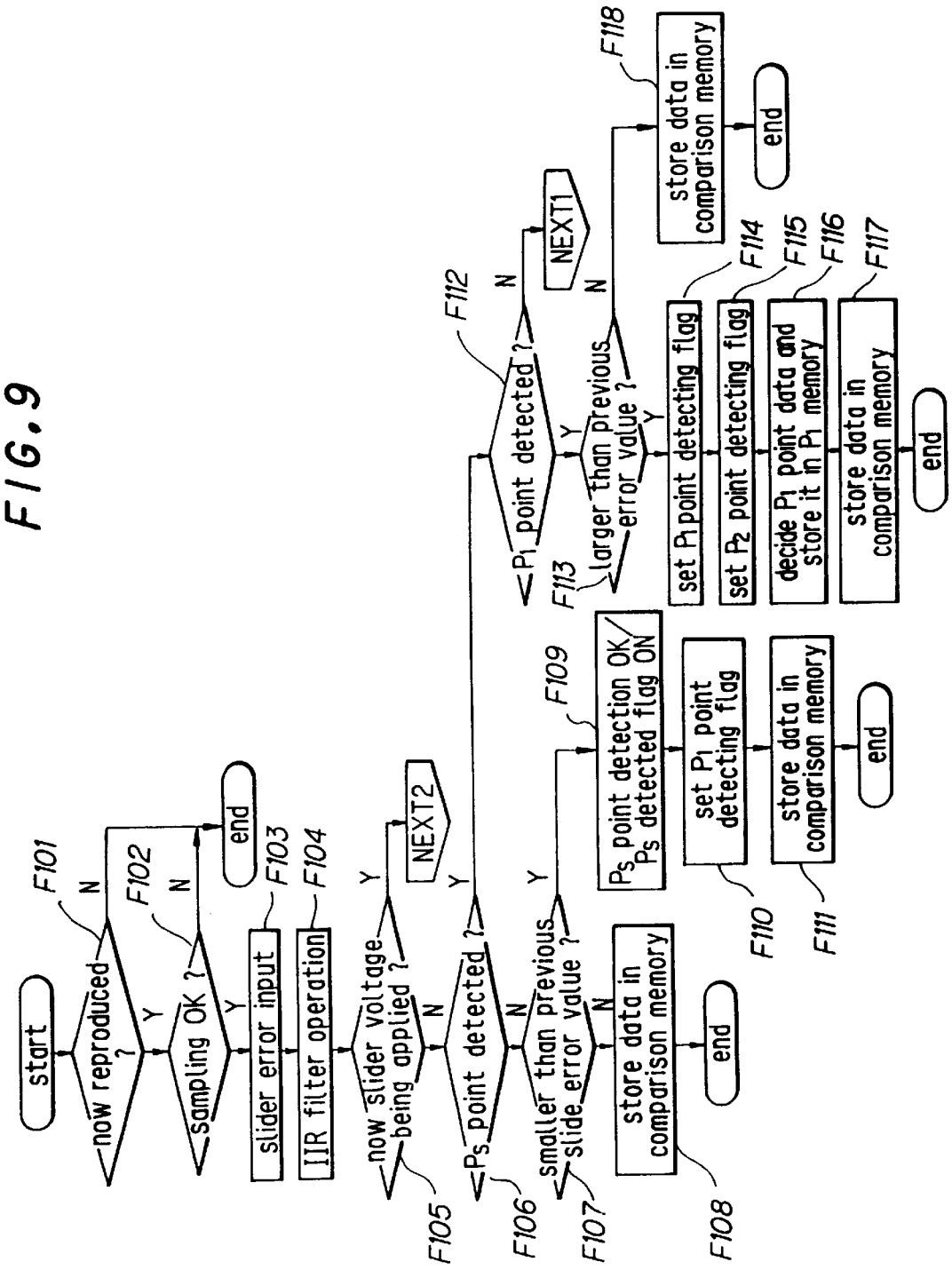
FIG. 9 is a flowchart showing the eccentricity measuring and sled control processes in accordance with the embodiment of the invention.
Figure 10:
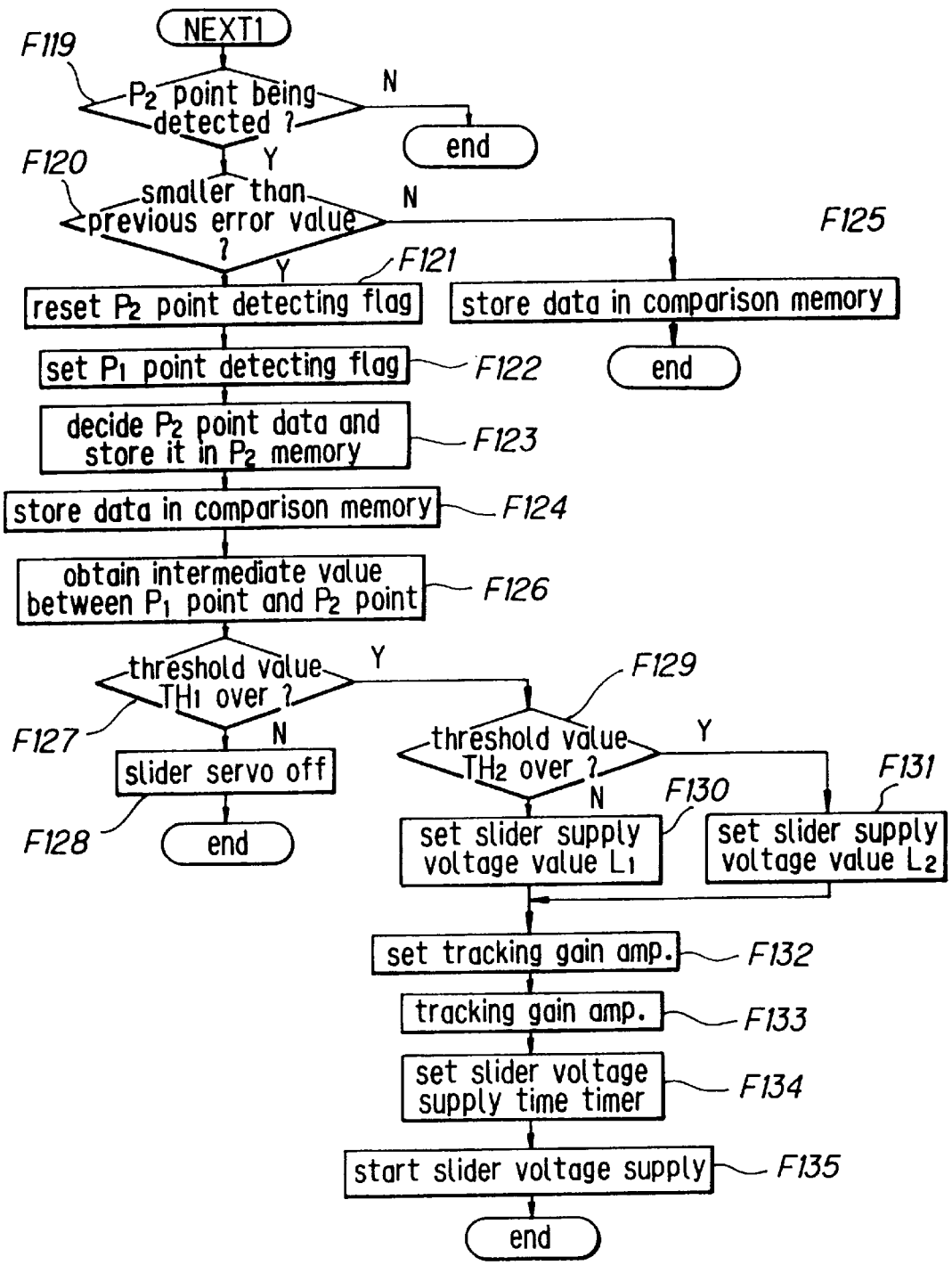
FIG. 10 is a flowchart showing the eccentricity measuring and sled control processes in accordance with the embodiment of the invention.
Figure 11:
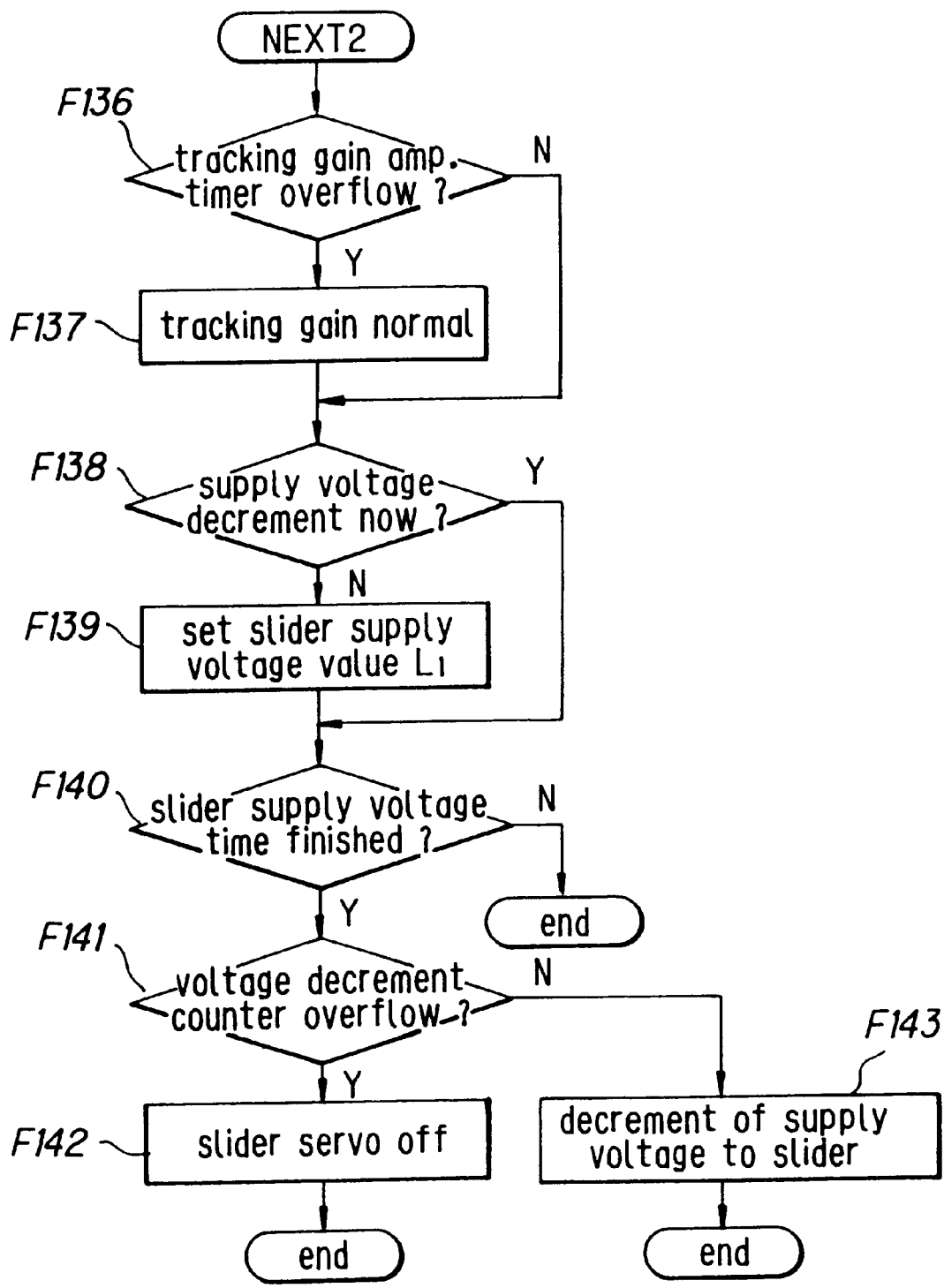
FIG. 11 is a flowchart showing the eccentricity measuring and sled control processes in accordance with the embodiment of the invention.

Eccentricity measurements and slide control operations carried out using this kind of system controller 12 and servo controller 8 are described in the flowcharts shown in FIGS. 9 to 11. These flowcharts show software based control operations which use the aforementioned conceptual structure.

The flowcharts in FIGS. 9 to 11 show process routines which are carried out, for example, every four msecs. The process at the system controller 12 goes to step F101 every four msecs and determines whether or not reproduction is currently taking place. If the system controller determines in step F101 that reproduction is not taking place, the following processes shown in FIGS. 9 to 11 are not carried out, and the process is completed. This routine will then not take place for a further four msecs.

If the reproducing operation is taking place so that the process routine is entered, step F102 is gone onto. During reproducing, the sled error signal is sampled by the A/D converter 8d, converted to digital data, and inputted, as described above. The system controller 12 therefore reads the sled error signal value at a period which is a number of milliseconds, in this case, 4 msecs, because the frequency band for the sine wave-shaped waveform which depends on the effects of the eccentricity is a low frequency of a number of Hz.

As a result of this, a sampling period of, for example, 4 msecs is taken as the sampling period at, for example, the A/D converter 8d and the sled error signal is converted to digital data. It is then determined during reproduction that the sampling timing is present in step F102, step F103 is gone onto and the sampled digital data is taken into the input register 31.

Digital filter arithmetic (F104) is then carried out by the filter 32 in order to remove the noise component from the sled error data which has been read in.

Next, at the system controller 12, it is determined whether or not the current drive pulse is being generated from the drive pulse generator 8c so that the sled motor 11 is being driven (F105). If the drive pulse is not being applied, the process proceeds to step F106 for the arithmetic processing to determine the extent of the eccentricity. If the drive pulse is being applied, the process goes to [NEXT2] so as to go on to the process shown in FIG. 11.

In the arithmetic process to determine the extent of the eccentricity, first, it is determined whether the peak value $P_s$ has already been detected by confirming to see if the $P_s$ detection flag is present (F106).

Detection of the peak value $P_s$ is something which is only carried out once at initialization conditions. Initialization conditions are when the disc is installed or when a track jump is completed.

If the peak value $P_s$ is not detected under initialization conditions, the process goes to step F107. It is then determined if the sled error value inputted on this occasion is smaller than the sled error value inputted on the previous occasion. If the sled error value is larger than on the previous occasion then the sled error waveform is going towards a peak value and alternatively, if the sled error value is smaller than the previous value it is going towards a trough value. It follows that the time when it is first detected that the inputted slide error value is smaller than the previous value is the time when the peak value has been exceeded. This means that the value for the previous time was a peak value.

Here, the comparison operation is carried out in step F107 at the extreme detection calculator 33. If the inputted sled error value is larger than the sled error value for the previous time, the data in the comparing memory 35 is re-written with this inputted value (F108) and the next sampling timing is waited for.

That is to say that the data in the comparing memory 35 is compared with the sled error value inputted in step F107 and is made to be the sled error value for the previous time.

When starting at a certain time, at the comparison process in step F107 of the process routine in FIG. 9, the sled error value for the current time will become smaller than the sled error value for the previous time stored in the comparing memory 35. When this happens, the process moves on to step F109, it is taken that the initial peak value $P_s$ has been detected from initialization conditions and the $P_s$ detection flag is set to "ON".

Next, the detecting $P_1$ flag is set to "ON" so that the process for detecting the trough value $P_1$ can be gone to (F110). Then, the sled error value for this time is re-written with the current sled error value and stored in a comparing memory 35 so that it can be used in the comparison process for detecting the point $P_1$, and the routine is completed.

Once the $P_s$ detection flag has been set to "ON", the process routine goes on to steps F106 to F112. Then, if it is detected in step F112 that the detecting $P_1$ flag is on, the process for detecting the trough value $P_1$ has been carried out, and the detecting $P_1$ flag is turned off, the process in FIG. 10 is gone to, as is shown by [NEXT1] in the diagram, and the detecting $P_2$ flag is confirmed in step F119. If the detecting $P_2$ flag is on, the process for detecting the peak value $P_2$ is carried out.

As described above, after the peak value $P_s$ has been detected from the initialization conditions, the detecting $P_1$ flag is set so that the process goes on to step F113 and the extreme detection operator 33 compares the sled error value for this time with the sled error value for the previous time stored in the comparing memory 35. Then, if the sled error value for this time is smaller than the sled error value for the previous time, the current sled error signal is going towards a trough value. The value in the comparing memory 35 is therefore renewed with the sled error value for this time in step F118.

In step F113, if the sled error value for this time is larger than that for the previous time then it has gone beyond the trough value $P_1$, that is to say that at this point in time the sled error value stored in the comparing memory 35 is the trough value $P_1$.

Here, the detecting $P_1$ flag is reset so that the detection of the trough value $P_1$ can be completed (F114) and the detecting $P_2$ flag is set (F115) so that the detection process for the following peak value $P_2$ can be carried out. The sled error value for the previous time stored in the comparing memory 35 at this point in time is then stored in the $P_1$ memory 36 (F116) as the trough value $P_1$ so as to fix the trough value $P_1$. At this time, it would also be possible to take the current sled error value as the trough value $P_1$ and store it in the $P_1$ memory 36.

The comparing memory 35 then has to be renewed with the sled error value for this time (F117) so that this can be used in the comparison process for detecting the peak values $P_1$ from hereinafter, and the process is completed.

In the process from the next time onwards, the process goes to the step F119 in FIG. 8 which is shown by [NEXT1] because the $P_s$ detection flag is on, the detecting $P_1$ flag is reset and the detecting $P_2$ flag is confirmed. The detection process for the peak value $P_2$ is then executed because the detecting $P_2$ flag is on.

Here, if the detecting $P_2$ flag is off, that is, if the detecting $P_1$ flag and the detecting $P_2$ flag are both reset, the process will come to an end. However, after the point $P_s$ has been detected from the initialization conditions, the trough values $P_1$ and the peak values $P_2$ are intermittently and reciprocally detected, so that unsettled results do not occur in step F119 under normal operating conditions.

In step F120 it is determined whether the sled error value for this time is smaller than the sled error value stored in the comparing memory 35 for the previous time.

If the sled error value for this time is larger than the sled error value for the previous time, the current sled error signal is in the middle of going towards a peak value. Therefore, in step F125, the value in the comparing memory 35 is renewed with the sled error value for this time and the process is completed.

In step F120, if the sled error value for this time is smaller than that for the previous time, then it has gone beyond the peak value $P_2$, that is to say that at this point in time the sled error value stored in the comparing memory 35 is the peak value $P_2$.

The detecting $P_2$ flag is reset so that the detection of the peak value $P_2$ is completed (F121) and the detecting $P_1$ flag is set (F122) so that the detection process for the following trough value $P_1$ can be shifted to. The sled error value for the previous time stored in the comparing memory 35 at this time is taken as the peak value $P_2$ and stored in the $P_2$ memory 37 (F123) so that the peak value $P_2$ becomes fixed. Now, taking the value decided in the process in step F116 occurring in the previous process as the trough value $P_1$, when the current value for the sled error value at this time is taken as the trough value $P_1$ and stored in the $P_1$ memory 36, the sled error value for this time is also taken as the peak value $P_1$ in this step F123 and stored in the $P_2$ memory 37.

Then, the comparing memory 35 is renewed (F124) with the sled error value for this time so that this can be used in the comparison process for detecting the peak value $P_s$ hereinafter.

Here, as the trough value $P_1$ and the peak value $P_2$ have been detected, an average value CT is obtained at the average value calculation section 34 from the trough value $P_1$ stored in the $P_1$ memory 36 and the peak value $P_2$ stored in the $P_2$ memory 37. A sled error value for which the eccentricity component is canceled is therefore obtained (F126).

As this average value CT for the sled error value is the average value for the extent of the offset of the entire optical head and the objective lens, it is compared with the threshold value $TH_1$ at the comparing section 40. It is then determined whether or not the relative shifting between the optical head and the optical head is necessary to bring the operation of the objective lens in to within the range for which the eccentricity can be brought in by the tracking servo (F127).

If the average value CT does not exceed the threshold value $TH_1$, the sled operation is not necessary and the sled control processing section 42 goes from this comparison result to the step F128 so that the sled servo is turned off and the process is complete.

By carrying out this process from step F101 every 4 msecs, the trough value $P_1$ and the peak value $P_2$ can be detected every period of the sled error signal. The average vale CT can then be obtained after the peak value $P_2$ has been detected. However, as the sled servo is off and the relative shifting between the optical head and the optical disc is not carried out, the offset between the objective lens and the entire optical head gradually increases. As a result of this, at some point in time it will be detected that the average value CT will have exceeded the threshold value $TH_1$.

After doing this, the process goes onto step F129 where it is determined by the comparing section 41 whether or not the average value CT has exceeded the threshold value $TH_2$ from the comparison result.

If the average value CT has not exceeded the threshold value $TH_2$, a normal sled operation of the kind shown at the time $T_1$ in FIG. 5e is carried out.

Namely, in step F130, the sled control process section 42 sets a normal voltage level $L_1$ as a drive pulse and sends this information to the drive pulse generator 8c.

Then, the tracking gain is to be raised for a fixed period of time so that the tracking does not go out during the relative shifting between the optical head and the optical disc, so the tracking gain timer is set (F132) in order to do this. The tracking gain is then raised up to a prescribed level (F133). The conceptual block diagram for this operational function is not shown in FIG. 8, but the system controller 12 carries out the control of the increasing of the tracking gain for the servo controller 8 in a period which is dictated by the tracking gain timer 43.

Further, as the control is carried out for a drive pulse application period of, for example, 36 msecs, after the drive timer 44 has been set (F134), the sled control processing section 42 commences the application of the prescribed voltage pulse (F135) shown by the pulse applied at a point in time directly after the time $T_1$ in FIG. 5e to the sled motor 11 from the slide drive pulse generator 8c via the driver 10.

The process then goes from step F105 to [NEXT2] and on to step F136 in FIG. 11 after the application of this pulse voltage has commenced.

Then, at a certain point in time it is determined whether the tracking gain timer 43 has overflowed or not, and then after a fixed period of time set at the tracking gain timer 43 has elapsed since the start of the shifting, the tracking gain is returned to normal conditions (F137).

In the process which follows the four milliseconds after the relative shifting of the optical head and the optical disc has started, the process moves on to step F139 in FIG. 11 and the drive pulse is set to a normal voltage level $L_1$. At this time during the starting of the shift starting, when a normal voltage level $L_1$ has been set in step F130, the drive pulse according to this step F139 is not changed.

Then, the drive timer 44 in step F140 is verified and it is determined whether or not 36 msecs have passed. A normal level drive pulse is then applied intermittently in the way as with the pulse directly after the time $T_1$ in FIG. 5e.

The process from FIG. 9 is carried out every 4 msecs. It is therefore determined in the ninth process routine from the start of the relative shifting between the optical head and the optical disc in step F140 that 36 msecs has passed using the slide drive timer 44. The process then goes from step 141 to step 143, the decrement counter 45 is set and the process to gradually lower the pulse voltage is started.

Then, in the process from the next time, as the applied voltage is being decreased, the step F139 is not gone through, the process goes from step F138–F140–F141 and the voltage decrement control is intermittently carried out in step F143 until the decrement counter 45 overflows.

By overflowing the decrement counter 45, the sled servo is turned off, and the outputting of the drive pulse is completed. In this way, as shown in FIG. 5e, a drive pulse of a normal voltage level $L_1$ is outputted within the period from a time directly after the time $T_1$ until the next trough value $P_1$ is detected. Also, the pulse voltage is gradually lowered while the sled is in halt.

The process for detecting the trough value $P_1$ is shifted to after the subsequent four milliseconds after this completion.

It can be seen from FIGS. 4a and 4b that the relative shifting between the optical head and the optical disc can be carried out using drive pulses of this kind of normal voltage level $L_1$, but, depending on the circumstances, there are also cases where the stationary coefficient of friction may be large or correct sliding cannot be carried out. In this kind of case, as shown in FIG. 5a, the offset between the objective lens and the optical head will increase and the average value CT will become higher.

If the sled operation remains incorrect, the average value CT calculated after the detection of the peak value $P_2$ at a time $T_3$ will exceed the threshold level $TH_2$.

In this case, the process goes from the step F129 to F131 in FIG. 10, and the voltage applied as the slide drive pulse is set to be a high level $L_2$. The relative shifting between the optical disc and the optical head is then started using the $L_2$ level drive pulse via the process in steps F132 to F135.

This applied voltage $L_2$ is made to be sufficient to negate the stationary coefficient of friction of the sled mechanism and provide an immediate sled operation response and should be, for example, a level which is twice that of the normal level $L_1$. It follows that the relative shifting between optical head and the optical disc commences immediately after the time $T_3$ as a result of the application of the slide pulse.

The process at the time after the application of this kind of high level pulse voltage has started goes on from step F105 to step F136 in FIG. 11, and on to step F139. Here, the pulse voltage level is set to a normal level $L_1$. Therefore, the drive pulse is made to be a high level pulse just for the first four milliseconds, as shown by the pulse after the time $T_3$ in FIG. 5e, and thereafter becomes a normal level composite pulse until 36 milliseconds have passed since the start of the sled operation.

After these 36 milliseconds have passed, the applied voltage is gradually decreased to gear for the halting of the sled operation in the aforementioned way.

By carrying out the above process intermittently, sled control can be carried out using the drive pulse shown in FIG. 5e.

Detailed descriptions of the respective slide control methods in FIGS. 4b and 4c or FIGS. 5b to 5d have been omitted but these can be carried out with the modification of just one part of the process in FIGS. 9 to 11.

Also, the average value CT was obtained from the trough value $P_1$ and the peak value $P_2$, but, naturally, this could also be obtained from the peak value $P_2$ and the following trough value $P_1$.

The present invention is particularly applicable to eccentricity measuring apparatus for disc recording medium playback apparatus, recording apparatus and recording/playback apparatus but can also be used for other processes where the measured degree of eccentricity is for items other than slide drives, such as servo band setting control which corresponds to degrees of eccentricity.

What is claimed is:

1. A recording and/or reproducing apparatus for a disc-shaped recording medium, comprising:
   an optical head for irradiating an optical beam onto the disc-shaped recording medium;
   rotational driving means equipped with the disc-shaped recording medium for rotating the disc-shaped recording medium;

transfer means for transferring said optical head relative to said rotational driving means in a radial direction of the disc-shaped recording medium;

error signal generating means for generating an error signal exhibiting the amount of the relative shifting of a spot of a light beam irradiated from said optical head, which is produced on the basis of an output signal from said optical head, on the disc-shaped recording medium with respect to a track on the disc-shaped recording medium; and control means which detects a peak value and a trough value of the error signal supplied from the error signal generating means and compares a difference signal exhibiting a difference between the detected peak value and the detected trough value with a reference threshold value to generate a drive signal to be supplied to the transfer means on the basis of a comparison output signal;

wherein the drive signal from said control means is supplied to said transfer means to shift said optical head relative to said rotational driving means in the radial direction of the disc-shaped recording medium.

2. A recording and/or reproducing apparatus for a disc-shaped recording medium as claimed in claim 1, wherein said control means comprises detecting means for sampling the error signal from said error signal generating means and for comparing a sampled value with a previously sampled value to detect said peak value and said trough value; calculating means for calculating an average value on the basis of said peak value and said trough value outputted from said calculating means; and comparing means for comparing the average value outputted from said calculating means with a reference threshold value.

3. A recording and/or reproducing apparatus for a disc-shaped recording medium as claimed in claim 2, wherein said control means further comprises analog-to-digital converting means for converting the error signal from said error signal generating means into a digital error signal, wherein the digital error signal from said analog-to-digital converting means is supplied to said detecting means.

4. A recording and/or reproducing apparatus for a disc-shaped recording medium as claimed in claim 2, wherein said detecting means samples the error signal from said error signal generating means and compares a sampled value with a previously sampled value in a time-axial direction to detect said peak value and said trough value.

5. A recording and/or reproducing apparatus for a disc-shaped recording medium as claimed in claim 2, wherein said control means further comprises drive signal generating means for generating a drive signal on the basis of the comparison output signal from said comparing means.

6. A recording and/or reproducing apparatus for a disc-shaped recording medium, comprising:

an optical head for irradiating an optical beam onto the disc-shaped recording medium;

rotational driving means equipped with the disc-shaped recording medium for rotating the disc-shaped recording medium;

transfer means for transferring said optical head relative to said rotational driving means in a radial direction of the disc-shaped recording medium;

error signal generating means for generating an error signal exhibiting the amount of the relative shifting of a spot of a light beam irradiated from said optical head, which is produced on the basis of an output signal from said optical head, on the disc-shaped recording medium with respect to a track on the disc-shaped recording medium; and control means for detecting a peak value and a trough value of the error signal supplied from the error signal generating means, comparing a difference signal exhibiting a difference between the detected peak value and the detected trough value with a reference threshold value, and generating a first drive pulse signal and a second drive pulse signal to be supplied to the transfer means on the basis of a comparison output signal, wherein said control means includes;

detecting means for sampling the error signal from said error signal generating means and for comparing a sampled value with a previously sampled value to detect said peak value and said trough value;

calculating means for calculating an average value on the basis of said peak value and said trough value outputted from said calculating means:

comparing means for comparing the average value outputted from said calculating means with a reference threshold value, the comparing means including a first comparator for comparing the average value supplied from said calculating means with a first reference threshold value, and a second comparator for comparing said average value with a second reference threshold value;

a drive signal generating means for generating the first drive pulse signal on the basis of a comparison output signal supplied from said first comparator and the second drive pulse signal on the basis of a comparison output signal supplied from said second comparator;

wherein the first drive pulse signal and the second drive pulse signal from said control means are supplied to said transfer means to shift said optical head relative to said rotational driving means in the radial direction of the disc-shaped recording medium.

7. A recording and/or reproducing apparatus for a disc-shaped recording medium as claimed in claim 5, wherein said drive signal generating means outputs a drive pulse signal so that a voltage value is gradually lowered on the basis of the comparison output signal from said comparing means.

8. A recording and/or reproducing apparatus for a disc-shaped recording medium as claimed in claim 5, wherein said drive signal generating means outputs a drive pulse signal a voltage value of which is changed step by step on the basis of the comparison output signal from said comparing means and having a voltage value at a falling time being lower than that at a rising time.

9. A recording and/or reproducing apparatus for a disc-shaped recording medium as claimed in claim 1, further comprising:

tracking control servo means supplied with the error signal for positioning the optical head to follow the track on the disk-shaped recording medium, the tracking control servo means having a maximum range of positional error between the optical head and the track which the tracking control servo is able to correct, and wherein the reference threshold value is selected to represent the maximum range of eccentricity of the disc-shaped recording medium which can be corrected by the tracking servo.

10. A method of measuring the amount of eccentricity of an optical disc comprising:

a first step of generating an error signal exhibiting the amount of relative displacement of a spot of a light beam irradiated from an optical head onto the optical disc with respect to a track on the optical disc on the basis of an output signal from the optical head;

a second step of detecting a peak value and a trough value of the error signal generated to generate a difference signal exhibiting a difference between the peak and trough values detected by the sub-steps of sampling the error signal generated, comparing a sampled value with a previously sampled value, detecting said peak value and said trough value on the basis of a comparison result, and calculating an average value from a difference between said peak value and said trough value detected; and a third step of calculating the amount of eccentricity of the disc-shaped recording medium on the basis of the difference signal by comparing the average value obtained in said second step with a reference threshold value to calculate the amount of eccentricity of the disc-shaped recording medium.

11. An apparatus for measuring the amount of eccentricity of a disc-shaped recording medium, comprising:

error signal generating means for generating an error signal exhibiting the amount of relative displacement of a spot of a light beam irradiated from an optical head onto the disc-shaped recording medium with respect to a track on the disc-shaped recording medium on the basis of an output signal from the optical head; and calculating means which detects a peak value and a trough value of the error signal supplied from said error signal generating means to calculate the amount of eccentricity of the disc-shaped recording medium on the basis of a difference signal exhibiting a difference between the peak and trough values detected, wherein said calculating means includes detecting means which samples the error signal from said error signal generating means and compares a sampled value with a previously sampled value to detect said peak value and said trough value, and average value calculating means for calculating an average value on the basis of the peak and trough values outputted from said detecting means, and comparing means for comparing the average value outputted from said average value calculating means with a reference threshold value.

* * * * *

UNITED STATES PATENT AND TRADEMARK OFFICE
CERTIFICATE OF CORRECTION

PATENT NO. : 6,266,304 B1
DATED : July 24, 2001
INVENTOR(S) : Shuichi Nagano et al.

It is certified that error appears in the above-identified patent and that said Letters Patent is hereby corrected as shown below:

Column 5,
Line 3, change "it's" to -- its --.
Line 55, after "whole" insert -- of --.

Column 6,
Line 13, after "the" (second occurrence), insert -- average --.
Line 39, after "$TH_1$" insert -- and --.
Line 64, after "pulse" insert -- is --.

Column 7,
Line 22, after "an" insert -- average --.

Signed and Sealed this

Thirty-first Day of December, 2002

JAMES E. ROGAN
*Director of the United States Patent and Trademark Office*